US012654225B2

(12) United States Patent
Gao

(10) Patent No.: US 12,654,225 B2
(45) Date of Patent: Jun. 16, 2026

(54) METHODS FOR 3D PRINTING AND ADDITIVE MANUFACTURING OF REFRACTORY ALLOYS

(71) Applicant: CASTHEON INC, Thousand Oaks, CA (US)

(72) Inventor: Youping Gao, Thousand Oaks, CA (US)

(73) Assignee: Addman Intermediate Holdings, LLC, Fort Myers, FL (US)

( * ) Notice: Subject to any disclaimer, the term of this patent is extended or adjusted under 35 U.S.C. 154(b) by 0 days.

(21) Appl. No.: 18/239,366

(22) PCT Filed: May 25, 2022

(86) PCT No.: PCT/US2022/072574
§ 371 (c)(1),
(2) Date: Aug. 29, 2023

(87) PCT Pub. No.: WO2022/251854
PCT Pub. Date: Dec. 1, 2022

(65) Prior Publication Data
US 2024/0335881 A1 Oct. 10, 2024

Related U.S. Application Data

(60) Provisional application No. 63/192,848, filed on May 25, 2021.

(51) Int. Cl.
| | |
|---|---|
| *C23C 24/08* | (2006.01) |
| *B22F 10/60* | (2021.01) |
| *C22C 1/04* | (2023.01) |
| *C23C 28/02* | (2006.01) |
| *B33Y 10/00* | (2015.01) |
| *B33Y 40/20* | (2020.01) |
| *B33Y 70/00* | (2020.01) |

(52) U.S. Cl.
CPC ............. *B22F 10/60* (2021.01); *C22C 1/045* (2013.01); *C23C 24/08* (2013.01); *C23C 28/021* (2013.01); *B22F 2998/10* (2013.01); *B22F 2999/00* (2013.01); *B33Y 10/00* (2014.12); *B33Y 40/20* (2020.01); *B33Y 70/00* (2014.12)

(58) Field of Classification Search
None
See application file for complete search history.

(56) References Cited

U.S. PATENT DOCUMENTS

| | | | | |
|---|---|---|---|---|
| 5,374,393 | A | * 12/1994 | Gettliffe | ............... C22C 19/056 420/444 |
| 10,105,798 | B2 | 10/2018 | Szuromi | |
| 2006/0156958 | A1* | 7/2006 | Simmons | ............... C04B 28/00 106/801 |
| 2018/0044798 | A1 | 2/2018 | Walker | |
| 2020/0391292 | A1* | 12/2020 | Shuck | ..................... B22F 10/60 |

FOREIGN PATENT DOCUMENTS

| | | |
|---|---|---|
| WO | WO 2020/122992 | 6/2020 |
| WO | WO-2020122992 A1 * | 6/2020 |

* cited by examiner

*Primary Examiner* — Joshua L Allen
*Assistant Examiner* — Bradford M Gates

(57) ABSTRACT

A part made from a refractory alloy is manufactured using additive manufacturing or casting. The part is coated with a protective coating prior to the step of hot isostatic pressing the part.

18 Claims, 4 Drawing Sheets

METHODS FOR 3D PRINTING AND ADDITIVE MANUFACTURING OF REFRACTORY ALLOYS

CROSS REFERENCE TO RELATED APPLICATIONS

Figure 1:
Figure 2:
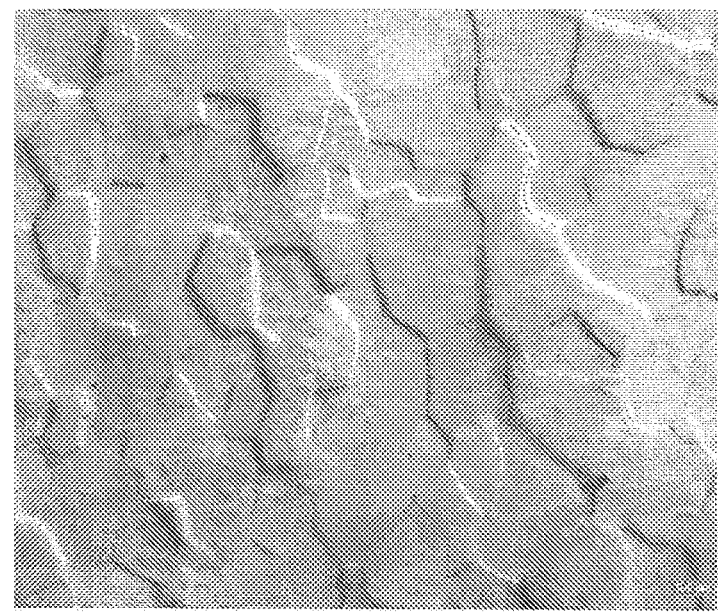
Figure 3:
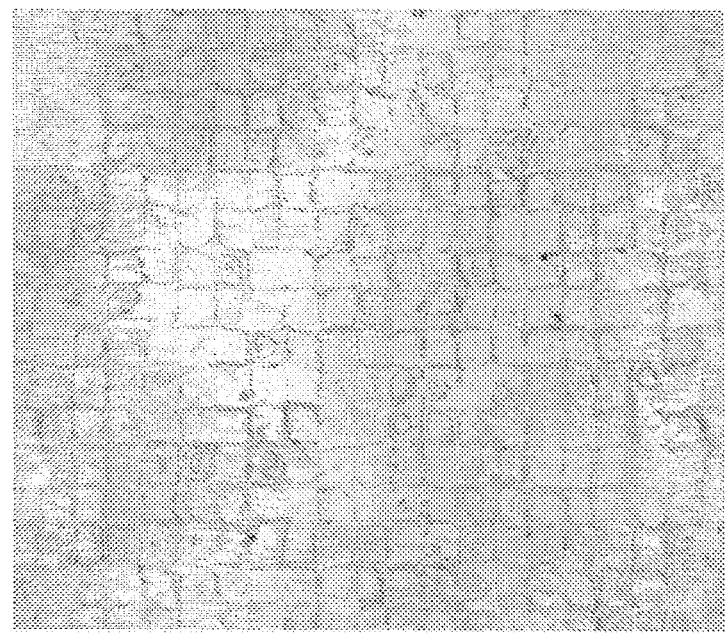
Figure 4:

This application is a continuation-in-part application of PCT Application PCT/US22/725784 which, in turn, is a completion application of U.S. Provisional Patent Application Ser. No. 63/192,848 filed on May 25, 2021, the disclosures of which are hereby incorporated by reference in their entirety.

FIELD

The present invention generally relates to processes for additive manufacturing or casting of refractory alloys.

BACKGROUND

In general, refractory alloys are mostly solid solution strengthened (substitutional strengthened) and are very sensitive to contamination from interstitial elements such as oxygen, nitrogen and carbon, to name a few. The most popular refractory alloy in the aerospace industry is Niobium Alloy C103 (Nb-10Hf-1Ti). Other refractory alloys include but are not limited to Niobium (Nb), Rhenium (Re), Tantalum (Ta), Molybdenum (Mo) and Tungsten (W) to name a few.

Refractory metals are a class of metals that are extraordinarily resistant to heat and wear. Their melting temperature are above 2400° C./4400° F., double that of a superalloy. The high melting temperature of refractory metals is extremely desirable for extreme high temperature applications, such as rocket engine, advanced turbine, missile, and hypersonic.

In general, refractory alloys are very sensitive to interstitial elements contamination (oxygen, nitrogen, carbon). For example, the most popular refractory alloy in the aerospace industry, the Niobium Alloy C103 (Nb-10Hf-1Ti), and other refractory alloys such as W—Re, Mo—Re, Ta—W may be easily contaminated. When interstitial elements concentrations are above containing limits (such as $O_2$:350 ppm and $N_2$:100 ppm), the refractory alloys properties degrade significantly. When contaminated, the alloys may exhibit undesirable characteristics such as embrittlement and/or loss of ductility (null ductility) which will literally render the material useless. The main reason for contamination and thus, degradation is: 1.) the interstitial elements didn't form stable oxides and/or nitrides; 2.) the interstitial elements are not in the size range where cohesive strengthening can be provided; 3.) the interstitial elements are not distributed evenly and instead are laced in the grain boundary, which weakens the overall material properties. So typical, refractory alloys have very tight, not to exceed, interstitial contents in the wrought form.

Additive manufacturing is a rapidly growing industry and there is a need to be able to create stronger materials and alloys that can be used with the additive manufacturing process. Additive manufacturing or casting provide great shaping capability but also may leave defects or voids in the materials that need to be closed i.e. eliminated through Hot Isostatic Press (HIP). To this end, there is a great need to figure out methods and processes to create parts that is free from defects or minimize the amount of defects

SUMMARY OF THE INVENTION

Objects of the present patent document are to provide improved methods of manufacturing parts from refractory alloys using additive manufacturing or casting. In preferred embodiments, the method comprises manufacturing a part made from a refractory alloy using additive manufacturing or casting. The part is then coated with a protective coating prior to the step of hot isostatic pressing the part. The protective coating is preferably a surface coating that is meant to be permanent part of the final product.

In preferred embodiments, the protective coating is selected from the group consisting of slurry coating, Chemical Vapor Deposition coating, Physical Vapor Deposition coating and EL coating.

In preferred embodiments, the refractory alloy is selected from the group consisting of Niobium Alloy C103 (Nb-10Hf-1Ti), Niobium (Nb), Rhenium (Re), Tantalum (Ta), Molybdenum (Mo) and Tungsten (W).

In some embodiments, additional steps may be part of the process. In some embodiments, one or more interfaces on the part are machined prior to the coating step.

Optionally, the part is annealed prior to the coating step.

DETAILED DESCRIPTION OF THE PREFERRED EMBODIMENTS

For the traditional wrought alloy, the standard manufacturing process has the following steps:
Forged stock material
rough machining
finish machining
anneal (optional)
slurry coating, Chemical Vapor Deposition (CVD) coating, Physical Vapor Deposition (PVD) coating, EL coating
functional integration For the 3D printed (additive manufacturing, selective laser sintering, and similar processes) or casting refractory alloy, the standard manufacturing process has the following steps in this exact order:
3D printing
Hot Isostatic Press (HIP)
Finish machining
Anneal (optional)
slurry coating, CVD coating, PVD coating, EL coating
functional integration Since 3D printed or casted hardware may contain small and distributed flaws (discontinuities, voids, holes, and cracks) that HIP densification is often used to heal the flaws to enhance the materials properties of the part, particularly for mission critical applications. Traditionally, this step is always done immediately after 3D printing the part.

However, for the reactive refractory alloys, the HIP step is often the source of interstitial contamination that can destroy the material properties of a perfectly good part/product. The refractory alloys are so reactive at elevated temperature that not only a very clean HIP furnace is required to process them but they also required to be wrap with sacrificial foil materials such as Ta foil to protect them from furnace cycle contamination.

To this end, the Applicant has discovered a new process that prevents the HIP from degrading the properties of a refractory alloy. The new process moves the HIP step down in the process until after the coating process is applied. The new process takes advantage of the coating step to protect the refractory materials in the application stage and moves it into processing stage to protect the refractory materials from contamination during HIP. This can be done without degrading the coating function or materials properties.

This new process prevents the HIP step from degrading the refractory alloy through contamination. One embodiment of the new process is:

3D printing or casting
machining interface
anneal (optional)
slurry coating, CVD coating, PVD coating, EL coating
Hot Isostatic Press (HIP)
(optional finish machining)
functional integration The new process above, eliminates HIP contamination. The application of the coating prior to the HIP step protects the reactive refractory materials from interstitial attack at elevated temperatures including those found during HIP. Numerous suppliers known in the art supply protective coatings including independent companies such as Hitemco (NY) or Bodycote (CA) or Thermal Vac (CA). In other embodiments, the coating may be in house processed. The key is that the HIP step comes after the coating step and not before it.

As used herein, the term "protective coating" refers to a coating the is permanently applied to the part, not something that is removeable such as foil or other wraps.

It would not be obvious for one skilled in the art to move the coating step before the HIP step because the coating step is a finishing step. It would also not be obvious because HIP uses very high temperature and pressures and changes the material properties of the part and it would accordingly, be expected to damage or at least affect the material properties of the coating. It is also not obvious how the adhesion of the coating to the part would be affected by the HIP process.

The coating which is applied to the part is applied by any suitable method, including, for example, immersion, spray coating, and the like. The process hereof is particularly applicable to high temperature refractory alloys including, for example, Nb C103, niobium, rhenium, tantalum, molybdenum and tungsten alloys.

Preferably, in practicing the present invention, a slurry coating is applied. Suitable slurry coatings include, for example, a disilicide. Typically, the coating is applied at a temperature of about 2600° F. It should be noted that, although slurry coating is preferred, chemical vapor deposition and physical vapor deposition, along with electrostatic coating may be used herein. The disilicide slurry coating is particularly useful in connection with the manufacture of an Nb C103 part. The preferred protective coating is a nickel cobalt coating.

Moreover, there is a long felt need for this invention. To applicant's knowledge, the HIP step has always been performed prior to the coating step. Moreover, the industry itself has proven that coating the part prior to the HIP process is not obvious because of all the other solutions currently in use. These other solutions are often time consuming and expensive and thus, if coating first was obvious, it would have already been done. For example, when parts are made of refractory alloys, increased costs are incurred due to the requirement of a super clean HIP furnace. Extensive time and effort have been dedicated by the industry to try and keep the HIP process as clean as possible to prevent contamination. In addition, in the traditional process parts made from a refractory alloy are wrapped with sacrificial foil materials such as Ta foil to protect them from furnace cycle contamination.

The teachings herein, eliminate or greatly reduce the need for a cleaner HIP process and other solutions such as foil wrapping the part. In addition, the results of the processes taught herein are superior and more consistent than simply trying to keep the HIP process clean and or fail wrapping the part.

Having, thus, described the invention, what is claimed is:

1. A method of manufacturing a part, the method comprising:
   (a) additive manufacturing the part from a high temperature refractory alloy, wherein the high temperature refractory alloy is a niobium (Nb) refractory alloy having a melting point above 2400° C.;
   (b) applying a silicide material to at least a portion of an exterior of the part, after the additive manufacturing, to interact with the high temperature refractory alloy to form a permanent, silicide-based protective coating on the at least a portion of the exterior of the part; and
   (c) thereafter, hot isostatic pressing the part, wherein the protective coating is permanently retained on the part after the hot isostatic pressing.

2. The method of claim 1, wherein the silicide material is applied by using a slurry coating process, chemical vapor deposition process, a physical vapor deposition process or an electrodeposition process.

3. The method of claim 2, further comprising: machining an interface on the part prior to applying the silicide material.

4. The method of claim 3, further comprising: annealing the part prior to applying the silicide material.

5. The method of claim 1 wherein the silicide material is a disilicide.

6. A method of manufacturing a high temperature refractory alloy final part comprising:
   (a) forming a high temperature refractory alloy initial part, using an additive manufacturing process, from a high temperature refractory alloy comprising a niobium (Nb) refractory alloy having a melting point above 2400° C.;
   (b) applying a silicide material to form a permanent protective coating and to permanently adhere the permanent protective coating to at least a portion of an outer surface of the high temperature refractory alloy initial part, using a process selected from the group consisting of a slurry coating process, a chemical vapor deposition process, a physical vapor deposition process, and a electrodeposition process; and
   (c) thereafter, performing a hot isostatic pressing operation on the high temperature refractory alloy initial part thereby creating a high temperature refractory alloy final part, wherein the permanent protective coating protects the high temperature refractory alloy against contamination during the hot isostatic pressing operation to retain ductility of the high temperature refractory alloy, and wherein the permanent protective coating is retained on the high temperature refractory alloy final part after the hot isostatic pressing operation.

7. The method of claim 6, further comprising:
   machining an interface on the high temperature refractory alloy initial part prior to applying the silicide material.

8. The method of claim 7, further comprising:
   annealing the high temperature refractory alloy initial part prior to applying the silicide material.

9. The method of claim 6, wherein the silicide material is applied using the slurry coating process comprising either immersion or spraying.

10. The method of claim 9, wherein the niobium refractory alloy is a niobium C103 alloy.

11. The method of claim 6 further comprising: conducting finish machining on the high temperature refractory alloy final part after the hot isostatic pressing operation.

12. The method of claim 6 further comprising: functionally integrating the high temperature refractory alloy final part into a product for high-temperature use, wherein the permanent protective coating is retained on the high temperature refractory alloy final part in the product.

13. A method of protecting a high temperature refractory alloy part, after additive manufacturing, during hot isostatic pressing without use of a temporary, protective sacrificial foil, the method comprising:

(a) applying a silicide material to at least a portion of an outer surface of the high temperature refractory alloy part to form a permanent, silicide-based protective coating on the at least a portion of the outer surface of the high temperature refractory alloy part, wherein the high temperature refractory alloy part is formed of a niobium (Nb) refractory alloy having a melting point of above 2,400° C.; and (b) thereafter, performing a hot isostatic pressing operation on the high temperature refractory alloy part, such that the protective coating protects the high temperature refractory alloy against contamination during the hot isostatic pressing operation to retain ductility of the high temperature refractory alloy, and wherein the permanent protective coating is retained on the high temperature refractory alloy part after the hot isostatic pressing operation.

14. The method of claim 13 wherein the high temperature refractory alloy is a niobium C103 alloy.

15. The method of claim 13 wherein the protective coating is a disilicide niobium eutectic intermetallic compound.

16. The method of claim 13, wherein the silicide material is applied to the high temperature refractory alloy part by using a slurry coating process, a chemical vapor deposition process, a physical vapor deposition process or an electrodeposition process.

17. The method of claim 13 further comprising: machining an interface on the high temperature refractory alloy part prior to applying the silicide material.

18. The method of claim 17, further comprising: annealing the high temperature refractory alloy part prior to applying the silicide material.

* * * * *